Oct. 12, 1926.
H. P. KRAFT
1,602,822
PRESSURE GAUGE INDEXING DEVICE
Original Filed March 29, 1922
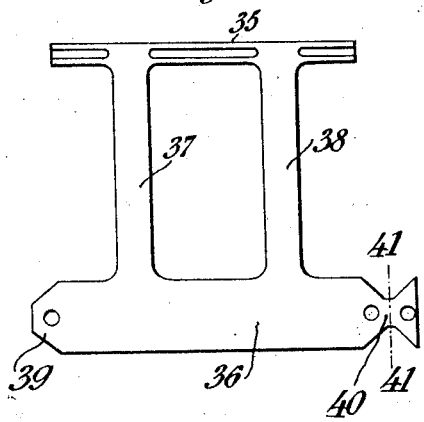
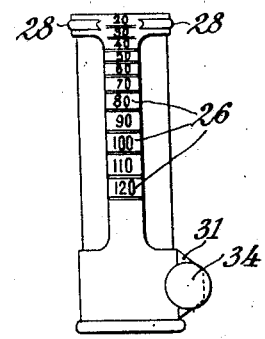
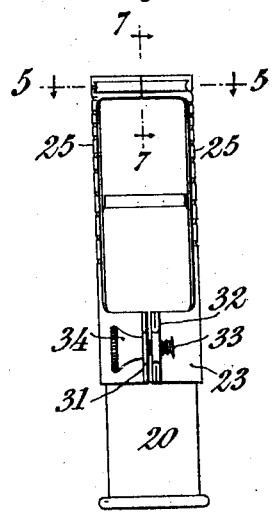
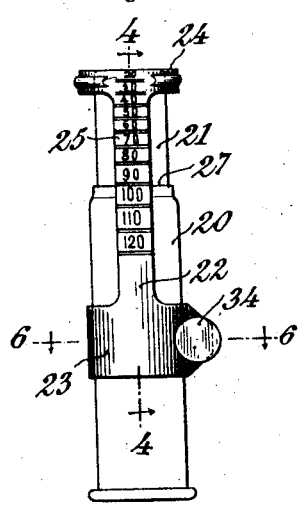
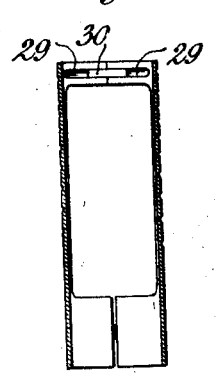
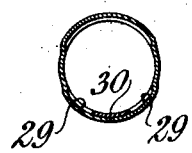
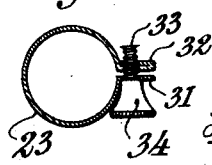
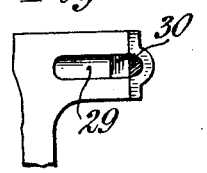
INVENTOR:
Henry Phillip Kraft,
By Attorneys,
Fraser, Jurk & Myers.

Patented Oct. 12, 1926.

1,602,822

UNITED STATES PATENT OFFICE.

HENRY PHILLIP KRAFT, OF RIDGEWOOD, NEW JERSEY, ASSIGNOR TO A. SCHRADER'S SON, INCORPORATED, OF BROOKLYN, NEW YORK, A CORPORATION OF NEW YORK.

PRESSURE-GAUGE INDEXING DEVICE.

Application filed March 29, 1922, Serial No. 547,857. Renewed March 27, 1926.

This invention relates to an indexing device adapted for use upon a pressure gauge of the pencil type, and is in the nature of an improvement upon the invention disclosed in the patent of Robert H. Henemier, No. 1,411,727, dated April 4, 1922. Such gauges comprise an indicating element normally housed within a tubular casing. In use the gauge is applied at one end to a tire valve and an indicating element is caused to protrude from the other end a distance depending upon the pressure of the medium within the tire. Pressure gauges of this character are ordinarily provided with a reading scale and index whereby the pressure registered may be read directly from the instrument.

It is one of the objects of the present invention to provide an auxiliary indexing device adapted for use on such a pressure gauge and as a result of which the readings of the same may be taken in the dark. The invention includes means whereby the gauge may be securely clamped at any one of a number of positions along the gauge casing. It also includes an indexing element adapted to be brought to different positions along the path of movement of the indicating element whereby the relative positions of the indicating element and indexing element may be compared by the sense of touch. It also includes a novel means of uniting the ends of the portion of the device which form the indexing element. It also includes a novel form of blank from which the indexing device may be constructed.

Referring to the drawings illustrating the preferred form of the invention.

Figure 1 illustrates a side view of the indexing device of the present invention applied to a well known form of pressure gauge.

Fig. 2 is a view of the same device the direction of vision being taken at right angles to that of Fig. 1.

Fig. 3 is a view similar to Fig. 1, the gauge being indicated in its normal position and the indexing device being indicated in its lowermost position to which it may be moved when not in use.

Fig. 4 is a section along the line 4—4 of Fig. 1, as viewed in the direction indicated by the arrows.

Fig. 5 is a section along the line 5—5 of Fig. 2, viewed in the direction indicated by the arrows.

Fig. 6 is a section along the line 6—6 of Fig. 1, viewed in the direction indicated by the arrows.

Fig. 7 is a fragmentary section drawn to a larger scale along the line 7—7 of Fig. 2, viewed in the direction indicated by the arrows.

Fig. 8 is a blank from which the essential part of the indexing device may be constructed.

The indexing device of the present invention is indicated generally by the reference character 22. It comprises a ring-shaped clamping portion 23 adapted to embrace the gauge casing and a ring-shaped indexing portion 24 adapted to be moved to various positions along the path of movement of the indicating element 21. The ring-shaped clamping element and the indexing element may be united by connecting arms 25 well adapted to receive scale markings 26. The upper end 27 of the gauge casing may be used as a convenient reference line in setting the indexing device to any desired position.

The indexing element of the device is preferably stiffened by means of ribs 28 which may be pressed from the material of which it is constructed thereby producing grooves 29 in its inner surface well adapted to receive the solder 30 or other means whereby the ends of the ring-shaped indexing element are united. This feature whereby the stiffening element of the indexing portion at the same time provides the groove to receive the solder whereby the ends of the ring-shaped portions are united is one of the important features of the invention. It provides means whereby the ends of the indexing portion may be rigidly secured together, at the same time leaving the inner surface of the indexing portion flush so as not to obstruct the movement of the indicating element of the gauge.

The clamping portion of the indexing device is preferably provided with outwardly disposed lugs 31, 32 adapted to be drawn together so as to render the clamping portion effective by means of a clamping screw 33 passing through the lug 31 and having threaded engagement with the lug 32. The clamping screw may be provided with a knurled head 34 whereby it may be rotated.

Preferably the lug 32 will be doubled upon itself, as clearly indicated in Figs. 2 and 6, so as to afford additional thickness of material to cooperate with the threads of the screw 33.

All parts of the indexing device except the attaching means by which the ends of the ring-shaped portions are united, may be constructed from a single sheet of metal or other suitable material cut to the shape indicated in Fig. 8 and bent to its finished form. This blank, as indicated in Fig. 8, comprises parallel portions 35, 36 from which the ring-shaped indexing element and ring-shaped clamping element, respectively, may be formed. These parts 35, 36 may be united by parallel connecting elements 37, 38. The portion from which the ring-shaped indexing element is formed is preferably stiffened by one or more ribs which may be pressed from the metal of the blank so as to form a half round projection extending from one surface thereof and providing a groove in the opposite surface. The groove produced by forming the rib in this manner affords space to receive the means whereby the ends of the ring may be united. This is preferably effected as heretofore described by filling the groove for a short distance in each direction from the joint with solder. This is best indicated in Figs. 4, 5 and 7.

The element 36 of the blank is provided with extensions 39, 40 which may be turned outwardly to form the lugs for the clamping screw by which the ends of the clamping portion are united. Preferably the extension 40 is of such size and form that it may be doubled upon itself along the line 41—41 of Fig. 8 to produce a double thickness of material which may be threaded to receive the screw 33.

When using the device the clamping portion 23 is slipped over the gauge casing, as indicated in Fig. 1, and moved along the same until the marking of the scale, corresponding with the pressure to which it is desired to inflate the tire, registers with the upper end of the casing. The indexing device is then firmly clamped in this position by tightening the screw 33. The gauge may then be applied to the valve, the pressure of which will cause the indicating element 21 to be protruded from the gauge casing a distance corresponding with the pressure to which it has been inflated. This pressure may be readily determined by lightly placing the finger over the end of the indexing element 24. If the indicating element either protrudes beyond the indexing element or has not been protruded sufficiently to assume a position in register therewith, the tire may either be slightly deflated or inflated as the case may be until the correct pressure is attained. It will be apparent that the reading may readily be made in the dark since it will be known that when the indicating element registers with the indexing element the pressure in the tire corresponds with that of the setting of the indexing device.

After determining the most effective tire pressure for any set of tires a device of the character herein described may be set to correspond with such pressure and firmly clamped upon the gauge casing by tightening the screw 33 after which the gauge may be used without further attention. Should it be desired to maintain different pressures in the front and rear tires of a machine it might be convenient to make use of two pressure gauges each equipped with an indexing device of the character herein described and each being permanently set to conform with the desired pressure of the respective tires in connection with which it is intended to be used. In this manner the operator would be enabled to inflate either set of tires to the desired pressure and take the readings in the dark without the necessity of first adjusting the setting of the indexing device.

If it is not desired to maintain any particular setting of the indexing device it may be moved to the position indicated in Fig. 3 relative to the gauge casing in which position the combined gauge and indexing device occupy little more space than the gauge alone.

It is to be understood that the invention is not intended to be limited to the specific form herein disclosed but is intended to include modifications and variations within the scope of the appended claims.

What I claim is:

1. An indexing device for a tubular pressure gauge comprising a ring-shaped indexing portion and a connected ring-shaped clamping portion, all cut and bent to form from a single blank, said ring-shaped portions being united at points lying in a line parallel with the longitudinal axis of the completed device.

2. An indexing device as specified in claim 1 having a circumferential stiffening rib in the indexing portion including the part where its ends are united, said ribbed portion having a groove in its inner surface, and attaching means disposed within said groove for uniting the opposed ends of said ring-shaped portion.

3. An indexing device as specified in claim 1 having a circumferential stiffening rib in the indexing portion including the part where its ends are united, said ribbed portion having a groove in its inner surface, and a connector of solder in said groove bridging the joint between said ends.

4. A blank for an indexing device of the character described comprising a sheet of suitable material including spaced parallel portions from which to form ring-shaped indexing and clamping members, spaced connecting portions uniting said parallel portions and adapted to receive scale markings, and extensions at the ends of one of said parallel portions adapted to form lugs to be united by a clamping screw.

5. A blank as specified in claim 4 having a stiffening rib running along the part from which the ring-shaped indexing portion is to be formed including the end portions adapted to be united to form the ring, said ribbed portion having therein a groove to receive the means for uniting said ends.

In witness whereof, I have hereunto signed my name.

HENRY PHILLIP KRAFT.